United States Patent
Nishio (10) Patent No.: US 8,416,737 B2
(45) Date of Patent: Apr. 9, 2013

(54) RADIO COMMUNICATION BASE STATION DEVICE AND CONTROL CHANNEL MCS CONTROL METHOD

(75) Inventor: Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/521,296

(22) PCT Filed: Dec. 25, 2007

(86) PCT No.: PCT/JP2007/074804
§ 371 (c)(1),
(2), (4) Date: Jun. 25, 2009

(87) PCT Pub. No.: WO2008/078733
PCT Pub. Date: Jul. 3, 2008

(65) Prior Publication Data
US 2009/0290541 A1    Nov. 26, 2009

(30) Foreign Application Priority Data

Dec. 26, 2006 (JP) ................... 2006-349785

(51) Int. Cl.
*H04W 4/00* (2009.01)
(52) U.S. Cl. ........................ 370/328; 455/434
(58) Field of Classification Search ............... 370/328; 455/434
See application file for complete search history.

(56) References Cited

U.S. PATENT DOCUMENTS

| | | | |
|---|---|---|---|
| 7,359,424 B2 | 4/2008 | Hosomi | |
| 2004/0071078 A1 | 4/2004 | Sudo | |
| 2006/0285607 A1* | 12/2006 | Strodtbeck et al. | 375/298 |
| 2007/0167160 A1* | 7/2007 | Asanuma et al. | 455/434 |
| 2007/0248041 A1 | 10/2007 | Seki | |

FOREIGN PATENT DOCUMENTS

| | | |
|---|---|---|
| EP | 1 892 987 | 2/2007 |
| EP | 1 976 317 | 10/2008 |
| JP | 2002-016526 | 1/2002 |
| JP | 2003-304218 | 10/2003 |
| WO | 2006/070466 | 7/2006 |
| WO | 2006/134946 | 12/2006 |
| WO | 2007/083569 | 7/2007 |

OTHER PUBLICATIONS

International Search Report dated Mar. 8, 2008.
3GPP TSG RAN WG1 #46, "L1/L2 Control Channel Structure with CDM Based Multiplexing in E-UTRA Downlink," KDDI, NTT DoCoMo, R1-062171, Sep. 2006, pp. 1-7.
3GPP TSG RAN #44, "E-UTRA Downlink Control Channel Structure and TP," Motorola, R1-060378, Feb. 2006, pp. 1-7.

(Continued)

Primary Examiner — Sai-Ming Chan
(74) Attorney, Agent, or Firm — Dickinson Wright PLLC (57) ABSTRACT

Provided is a radio communication base station device capable of reducing a communication overhead by a control channel such as SCCH (Shared Control Channel). In this device, each encoding unit (11) executes an encoding process for SCCH of each movement station, each modulation unit (12) executes a modulation process for the SCCH after being encoded, a distribution unit (102) arranges the SCCH to each movable station to one of subcarriers constituting an OFDM symbol, and a transmission power control unit (103) controls the SCCH transmission power according to received quality information reported from each movable station. An MCS setting unit (120) sets MCS in the encoding/modulation units (101-1 to 101-*n*) according to the SCCH-multiplexed number.

3 Claims, 8 Drawing Sheets

| MCS LEVEL | MCS |
|---|---|
| 1 | QPSK, R = 1/8 |
| 2 | QPSK, R = 1/5 |
| 3 | QPSK, R = 1/4 |
| 4 | QPSK, R = 1/3 |
| 5 | QPSK, R = 1/2 |
| 6 | QPSK, R = 2/3 |
| 7 | 16QAM, R = 1/2 |
| 8 | 16QAM, R = 3/4 |

OTHER PUBLICATIONS

3GPP TSG-RAN WG1 Meeting #47, "Multiplexing and Link Adaptation of Downlink L1/L2 Control Signaling," Panasonic, R1-063186, Nov. 2006, pp. 1-8.

3GPP TSG RAN WG1 Meeting #45, R1-061278, Shanghai, China, May 8-12, 2006, Source: NTT DoCoMo, Title: "Optimum Combination of Channel Coding Rate and Repetition Factor for L1/L2 Control Channel in E-UTRA Downlink," Agenda Item: 11.1.1, Document for: Discussion and Decision, May 2006, pp. 1-5, p. 4, line 6.

Notice of the Reasons for Rejection dated Jan. 8, 2013.

* cited by examiner

FIG.1

| MCS LEVEL | MCS |
|---|---|
| 1 | QPSK, R = 1/8 |
| 2 | QPSK, R = 1/5 |
| 3 | QPSK, R = 1/4 |
| 4 | QPSK, R = 1/3 |
| 5 | QPSK, R = 1/2 |
| 6 | QPSK, R = 2/3 |
| 7 | 16QAM, R = 1/2 |
| 8 | 16QAM, R = 3/4 |

FIG.2

| SCCH DEGREE OF MULTIPLEXING | MCS |
|---|---|
| 1, 2 | QPSK, R = 1/5 |
| 3, 4 | QPSK, R = 1/3 |
| 5 - 8 | QPSK, R = 1/2 |
| 9 - 12 | 16QAM, R = 1/2 |

FIG.3A

| SCCH DEGREE OF MULTIPLEXING | MCS |
|---|---|
| 1, 2 | QPSK, R = 1/8 |
| 3, 4 | QPSK, R = 1/5 |
| 5 - 8 | QPSK, R = 1/3 |
| 9 - 12 | QPSK, R = 1/2 |

FIG.3B

| SYSTEM BANDWIDTH | MCS |
|---|---|
| 1.25MHz | QPSK, R = 1/5 |
| 5MHz | QPSK, R = 1/3 |
| 10MHz | QPSK, R = 1/2 |
| 20MHz | 16QAM, R = 1/2 |

FIG.4A

| SYSTEM BANDWIDTH | MCS |
|---|---|
| 1.25MHz | QPSK, R = 1/8 |
| 5MHz | QPSK, R = 1/5 |
| 10MHz | QPSK, R = 1/3 |
| 20MHz | QPSK, R = 1/2 |

FIG.4B

| SUBFRAME TYPE | MCS |
|---|---|
| MULTICAST | QPSK, R = 1/3 |
| UNICAST | 16QAM, R = 1/2 |

FIG.5A

| SUBFRAME TYPE | MCS |
|---|---|
| MULTICAST | QPSK, R = 1/8 |
| UNICAST | QPSK, R = 1/3 |

| SCCH DEGREE OF MULTIPLEXING | MCS CANDIDATES | AVERAGE RECEIVED QUALITY |
|---|---|---|
| 1, 2 | QPSK, R = 1/8 | LESS THAN TH1 |
| | QPSK, R = 1/5 | EQUAL TO OR GREATER THAN TH1 |
| 3, 4 | QPSK, R = 1/4 | LESS THAN TH2 |
| | QPSK, R = 1/3 | EQUAL TO OR GREATER THAN TH2 |
| 5 - 8 | QPSK, R = 1/2 | LESS THAN TH3 |
| | QPSK, R = 2/3 | EQUAL TO OR GREATER THAN TH3 |
| 9 - 12 | 16QAM, R = 1/2 | LESS THAN TH4 |
| | 16QAM, R = 3/4 | EQUAL TO OR GREATER THAN TH4 |

FIG.8A

| SCCH DEGREE OF MULTIPLEXING | MCS CANDIDATES | AVERAGE RECEIVED QUALITY |
|---|---|---|
| 1, 2 | QPSK, R = 1/8 | LESS THAN TH1 |
| | QPSK, R = 1/5 | EQUAL TO OR GREATER THAN TH1 |
| 3, 4 | QPSK, R = 1/5 | LESS THAN TH2 |
| | QPSK, R = 1/4 | EQUAL TO OR GREATER THAN TH2 |
| 5 - 8 | QPSK, R = 1/4 | LESS THAN TH3 |
| | QPSK, R = 1/3 | EQUAL TO OR GREATER THAN TH3 |
| 9 - 12 | QPSK, R = 1/3 | LESS THAN TH4 |
| | QPSK, R = 1/2 | EQUAL TO OR GREATER THAN TH4 |

FIG.8B

| SCCH DEGREE OF MULTIPLEXING | MCS CANDIDATES | AVERAGE RECEIVED QUALITY |
|---|---|---|
| 1, 2 | QPSK, R = 1/8 | LESS THAN TH1 |
| | QPSK, R = 1/4 | EQUAL TO OR GREATER THAN TH1 |
| 3, 4 | QPSK, R = 1/5 | LESS THAN TH2 |
| | QPSK, R = 1/3 | EQUAL TO OR GREATER THAN TH2 |
| 5 - 8 | QPSK, R = 1/4 | LESS THAN TH3 |
| | QPSK, R = 1/2 | EQUAL TO OR GREATER THAN TH3 |
| 9 - 12 | QPSK, R = 1/3 | LESS THAN TH4 |
| | QPSK, R = 2/3 | EQUAL TO OR GREATER THAN TH4 |

FIG.8C

| SCCH DEGREE OF MULTIPLEXING | MCS CANDIDATES | RECEIVED QUALITY |
|---|---|---|
| 1, 2 | QPSK, R = 1/8 | LOW |
| | QPSK, R = 1/5 | HIGH |
| 3, 4 | QPSK, R = 1/4 | LOW |
| | QPSK, R = 1/3 | HIGH |
| 5 - 8 | QPSK, R = 1/2 | LOW |
| | QPSK, R = 2/3 | HIGH |
| 9 - 12 | 16QAM, R = 1/2 | LOW |
| | 16QAM, R = 3/4 | HIGH |

FIG.9A

| SCCH DEGREE OF MULTIPLEXING | MCS CANDIDATES | RECEIVED QUALITY |
|---|---|---|
| 1, 2 | QPSK, R = 1/8 | LOW |
| | QPSK, R = 1/5 | HIGH |
| 3, 4 | QPSK, R = 1/5 | LOW |
| | QPSK, R = 1/4 | HIGH |
| 5 - 8 | QPSK, R = 1/4 | LOW |
| | QPSK, R = 1/3 | HIGH |
| 9 - 12 | QPSK, R = 1/3 | LOW |
| | QPSK, R = 1/2 | HIGH |

FIG.9B

| SCCH DEGREE OF MULTIPLEXING | MCS CANDIDATES | RECEIVED QUALITY |
|---|---|---|
| 1, 2 | QPSK, R = 1/8 | LOW |
| | QPSK, R = 1/4 | HIGH |
| 3, 4 | QPSK, R = 1/5 | LOW |
| | QPSK, R = 1/3 | HIGH |
| 5 - 8 | QPSK, R = 1/4 | LOW |
| | QPSK, R = 1/2 | HIGH |
| 9 - 12 | QPSK, R = 1/3 | LOW |
| | QPSK, R = 2/3 | HIGH |

RADIO COMMUNICATION BASE STATION DEVICE AND CONTROL CHANNEL MCS CONTROL METHOD

TECHNICAL FIELD

The present invention relates to a radio communication base station apparatus and control channel MCS control method.

BACKGROUND ART

In recent years, various kinds of information apart from speech, such as images and data, have come to be transmitted in radio communications, and particularly in mobile communications. With the demand for still higher-speed transmission expected to continue to grow in the future, there is a need for a radio transmission technology that achieves high transmission efficiency through more efficient use of limited frequency resources in order to perform high-speed transmission.

One radio transmission technology capable of meeting such a need is OFDM (Orthogonal Frequency Division Multiplexing). OFDM is a multicarrier transmission technology that performs parallel transmission of data using a plurality of subcarriers, and is known for such features as high frequency efficiency and reduced inter-symbol interference in a multipath environment, and for its effectiveness in improving transmission efficiency.

Studies have been carried out into performing frequency scheduling transmission when this OFDM is used in a downlink, and data for transmission to a plurality of radio communication mobile station apparatuses (hereinafter referred to simply as mobile stations) is frequency-domain-multiplexed on a plurality of subcarriers.

In frequency scheduling transmission, a radio communication base station apparatus (hereinafter referred to simply as a base station) assigns subcarriers adaptively to mobile stations based on the received quality of each frequency band at each mobile station, enabling maximum multi-user diversity to be obtained. On the other hand, frequency scheduling transmission is normally performed for individual resource blocks in which a number of adjacent subcarriers are collected together into a block, and therefore it is not possible to obtain a very great frequency diversity effect.

In order to perform frequency scheduling transmission, prior to data transmission a base station transmits control information comprising a mobile station ID (user ID), resource block number, data channel modulation scheme and coding ratio (Modulation and Coding Scheme: MCS), and so forth, at the start of each subframe for a data transmission destination of each subframe. This control information is transmitted via an SCCH (Shared Control Channel). There are a number of SCCHs equal to the number of mobile stations to which data is transmitted in the relevant subframe, and the number of mobile stations per subframe is stipulated by the available frequency bandwidth (hereinafter referred to as system bandwidth) in the communication system or the like, for example. That is to say, at the start of each subframe, a number of SCCHs equal to the number of data channels in that subframe are multiplexed at the same time.

Also, with SCCHs, transmission power control is performed on a mobile station by mobile station basis. In this transmission power control, a plurality of SCCHs share power resources within the permissible transmission power (maximum transmission power) of a base station, and an SCCH for a mobile station near a cell boundary is controlled at high transmission power while an SCCH for a mobile station in the central area of a cell is controlled at low transmission power. By means of this transmission power control, limited power resources can be utilized efficiently by being shared in a flexible manner among the SCCHs of individual mobile stations.

Meanwhile, current standardization studies suggest that it is necessary for the MCS of an SCCH to be set to an MCS that meets a 95% coverage target—that is, an MCS such that 95% of all mobile stations within a cell can meet a required received quality. Consequently, an MCS with a rather low MCS level has hitherto been fixed as the MCS of an SCCH. For example, an MCS with QPSK as a modulation scheme and an coding ratio of R=1/8 is set as a fixed MCS that meets a 95% coverage target (see Non-patent Document 1).

Non-patent Document 1: 3GPP RAN WG1 Meeting document, R1-061278

DISCLOSURE OF INVENTION

Problems to be Solved by the Invention

Since an MCS with a rather low MCS level has hitherto been fixed as an SCCH MCS in this way, communication resource amounts (time resource and frequency resource amounts) expended for SCCHs are large, and so is the communication overhead due to SCCHs. As a result, data throughput decreases. Such adverse effects of fixing an MCS with a rather low MCS level for an SCCH MCS increase in proportion to the degree of multiplexing of an SCCH—that is, in proportion to the number of mobile stations per subframe.

It is an object of the present invention to provide a base station and control channel MCS control method that enable communication overhead due to a control channel such as an SCCH to be reduced.

Means for Solving the Problems

A base station of the present invention is a base station apparatus that multiplexes a plurality of control channels at the same time, and employs a configuration having an encoding section that encodes the plurality of control channels, a modulating section that modulates the plurality of control channels, and a setting section that sets an MCS in the encoding section and the modulating section according to a degree of multiplexing of the control channel.

ADVANTAGEOUS EFFECT OF THE INVENTION

The present invention enables communication overhead due to a control channel such as an SCCH to be reduced.

BEST MODE FOR CARRYING OUT THE INVENTION

Embodiments of the present invention will now be described in detail with reference to the accompanying drawings.

Embodiment 1

Figure 1:
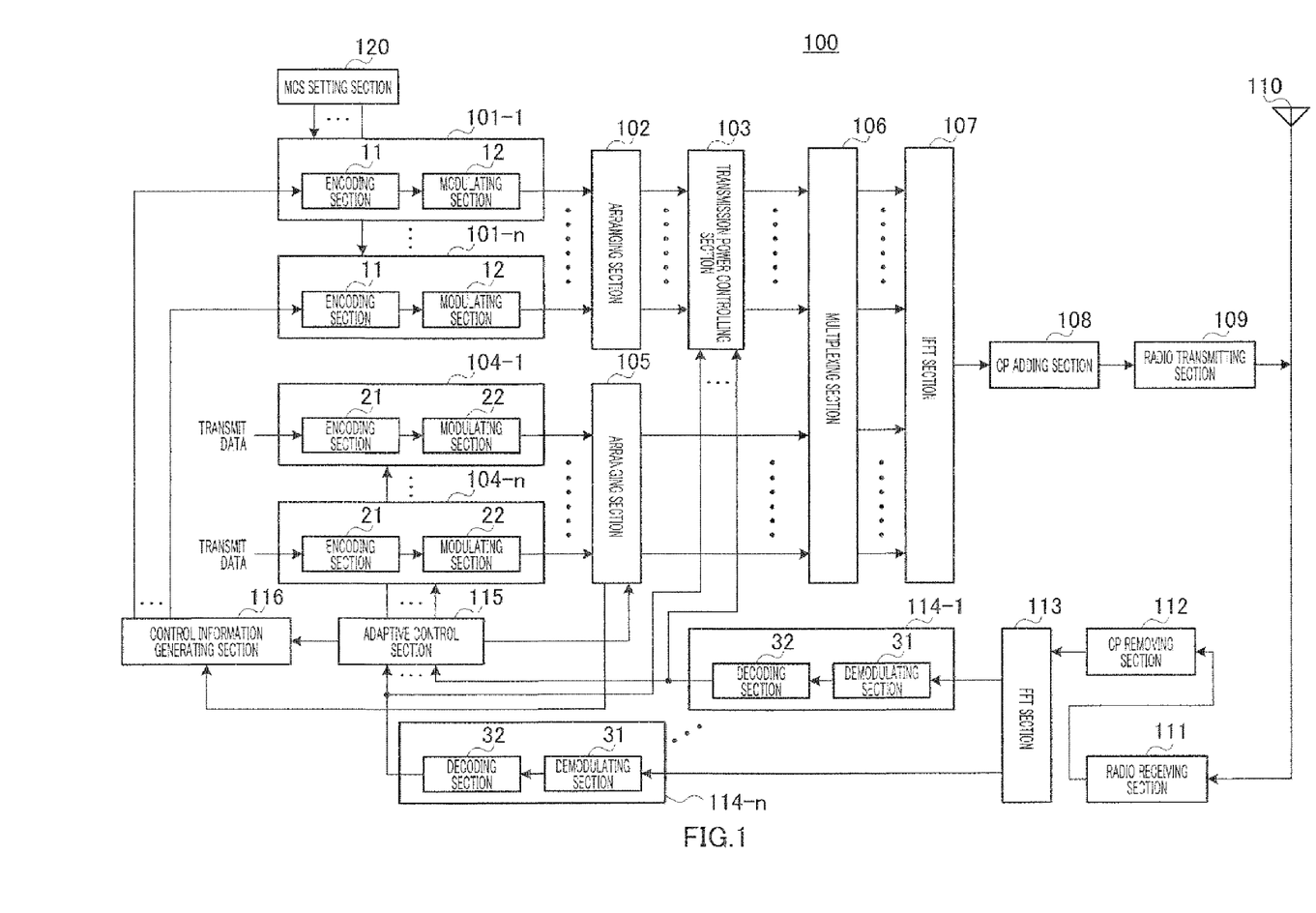
FIG. 1 is a block diagram showing the configuration of a base station according to Embodiment 1.

The configuration of base station 100 according to this embodiment is shown in FIG. 1. Base station 100 multiplexes a plurality of SCCHs at the same time.

In base station 100, a number "n" of encoding/modulating sections 101-1 through 101-n each comprising encoding section 11 and modulating section 12 for SCCH use, encoding/modulating sections 104-1 through 104-n each comprising encoding section 21 and modulating section 22 for data channel use, and demodulation/decoding sections 114-1 through 114-n each comprising demodulating section 31 and decoding section 32, are provided, where "n" is a number of mobile stations with which it is possible for base station 100 to communicate. Encoding/modulating sections 101-1 through 101-n, encoding/modulating sections 104-1 through 104-n, and demodulation/decoding sections 114-1 through 114-n correspond respectively to mobile stations 1 through n.

MCS setting section 120 sets an MCS in encoding/modulating sections 101-1 through 101-n. Details of MCS setting performed by MCS setting section 120 will be given later herein.

In encoding/modulating sections 101-1 through 101-n, each encoding section 11 performs encoding processing on per-mobile-station control information transmitted via a per-mobile-station SCCH in accordance with the MCS set by MCS setting section 120, and each modulating section 12 performs modulation processing on post-encoding control information in accordance with the MCS set by MCS setting section 120, and outputs the control information to arranging section 102.

Arranging section 102 arranges control information for transmission to each mobile station on one of a plurality of subcarriers configuring an OFDM symbol, and outputs the result to transmission power controlling section 103. That is to say, arranging section 102 arranges a plurality of SCCHs of each mobile station on one of a plurality of subcarriers configuring an OFDM symbol. By means of this arrangement processing by arranging section 102, a plurality of SCCHs are frequency-domain-multiplexed at the same time.

Transmission power controlling section 103 controls control information transmission power within permissible transmission power based on received quality information reported from each mobile station, and outputs this to multiplexing section 106. At this time, transmission power controlling section 103 controls control information transmission power on an SCCH-by-SCCH basis based on received quality information of a per-mobile-station overall communication band. Also, SCCH transmission power of each mobile station is set to transmission power such that each mobile station can receive control information with adequate received quality. To be more specific, transmission power controlling section 103 increases transmission power the lower the received quality, and lowers transmission power the higher the received quality. By this means, an SCCH for a mobile station near a cell boundary is controlled at high transmission power while an SCCH for a mobile station in the central area of a cell is controlled at low transmission power. That is to say, in transmission power controlling section 103, transmission power of each of a plurality of SCCHs is controlled according to the received quality of each mobile station within permissible transmission power.

In encoding/modulating sections 104-1 through 104-n, each encoding section 21 performs encoding processing on per-mobile-station transmit data, and each modulating section 22 performs modulation processing on post-encoding transmit data and outputs the transmit data to arranging section 105. An MCS at this time is in accordance with MCS information input from adaptive control section 115.

Arranging section 105 arranges data for transmission to each mobile station on one of a plurality of subcarriers configuring an OFDM symbol in accordance with control from adaptive control section 115, and outputs the result to multiplexing section 106. At this time, arranging section 105 arranges data for transmission to each mobile station on one of a plurality of subcarriers taking a resource block as a unit. Also, arranging section 105 outputs a mobile station ID and resource block number to control information generating section 116 as arrangement information of each data (information indicating in which resource block data for transmission to which mobile station is arranged).

Multiplexing section 106 time-domain-multiplexes control information input from transmission power controlling section 103 in each data input from arranging section 105, and outputs the result to IFFT (Inverse Fast Fourier Transform) section 107. Control information multiplexing is performed on a subframe-by-subframe basis, for example, with control information being multiplexed at the start of each subframe.

IFFT section 107 performs an IFFT on a plurality of subcarriers in which control information is arranged or a plurality of subcarriers in which data is arranged. That is to say, IFFT section 107 generates an OFDM symbol in which a plurality of SCCHs are frequency-domain-multiplexed or an OFDM symbol in which a plurality of data channels are frequency-domain-multiplexed. An OFDM symbol comprising an SCCH and an OFDM symbol comprising a data channel are time-domain-multiplexed in one subframe.

CP (Cyclic Prefix) adding section 108 adds the same signal as at the end of an OFDM symbol to the start of an OFDM symbol as a CP.

Radio transmitting section 109 performs transmission processing such as D/A conversion, amplification, and up-conversion on a post-CP-addition OFDM symbol, and transmits the symbol from antenna 110.

Meanwhile, radio receiving section 111 receives n OFDM symbols transmitted simultaneously from a maximum of n mobile stations via antenna 110, and performs reception processing such as down-conversion and A/D conversion on these OFDM symbols.

CP removing section 112 removes a CP from a post-reception-processing OFDM symbol.

FFT (Fast Fourier Transform) section 113 performs an FFT on a post-CP-removal OFDM symbol, and obtains per-mobile-station signals multiplexed in the frequency domain. Here, mobile stations transmit signals using mutually different subcarriers or mutually different resource blocks, and per-mobile-station signals each contain received quality information reported from the respective mobile station. Each mobile station can perform received quality measurement by means of a reception SNR, reception SIR, reception SINR, reception CINR, received power, interference power, bit error rate, throughput, an MCS that enables a predetermined error rate to be achieved, or the like. Received quality information may be expressed as a CQI (Channel Quality Indicator), CSI (Channel State Information), or the like.

In demodulation/decoding sections 114-1 through 114-n, each demodulating section 31 performs demodulation processing on a post-FFT signal, and each decoding section 32 performs decoding processing on a post-demodulation signal. By this means, received data is obtained. Received quality information within the received data is input to transmission power controlling section 103 and adaptive control section 115.

Adaptive control section 115 performs adaptive control on transmit data for transmission to each mobile station based on received quality information reported from each mobile station. That is to say, based on received quality information, adaptive control section 115 performs selection of an MCS capable of satisfying a required error rate for encoding/modulating sections 104-1 through 104-n, and outputs MCS information. This adaptive control is performed on a resource block by resource block basis. That is to say, adaptive control section 115 performs data channel adaptive control for each of a plurality of resource blocks. Also, based on received quality information, adaptive control section 115 determines for arranging section 105 in which resource block transmit data for transmission to each mobile station is to be arranged using a Max SIR method, Proportional Fairness method, or suchlike scheduling algorithm. Furthermore, adaptive control section 115 outputs per-mobile-station MCS information to control information generating section 116.

Control information generating section 116 generates per-mobile-station control information comprising per-mobile-station arrangement information and per-mobile-station MCS information, and outputs this to respective corresponding encoding sections 11.

Next, MCS setting performed by MCS setting section 120 will be described in detail.

If the SCCH degree of multiplexing—that is, the number of mobile stations assigned per subframe—is low (for example, in the case of an SCCH degree of multiplexing of 2), because of increased dispersion due to the small number of samples there is a higher probability of those mobile stations tending to be in a certain range within a cell, and thus there is also a higher probability of all mobile stations being near the cell boundary. In this case, therefore, bias also occurs in received quality reported from each mobile station and all received qualities become lower, as a result of which there is a higher probability of only SCCHs with high transmission power being multiplexed. Also, permissible transmission power in a base station is proportional to the SCCH degree of multiplexing—that is, permissible transmission power decreases as the SCCH degree of multiplexing decreases. Therefore, if the SCCH degree of multiplexing becomes low and only high-transmission-power SCCHs are multiplexed, the possibility arises of total SCCH transmission power not being able to be accommodated within the permissible transmission power. If total SCCH transmission power cannot be accommodated within the permissible transmission power, transmission power controlling section 103 lowers the transmission power of each SCCH to enable the total SCCH transmission power to be accommodated within the permissible transmission power. Thus, in this case, SCCH received quality in each mobile station ceases to satisfy the required received quality. Also, since the number of mobile stations per subframe is low, the 95% coverage target cannot be met even if there are only a very few mobile stations that are unable to satisfy the required received quality. Therefore, when the SCCH degree of multiplexing is low, it is necessary for a drop in received quality accompanying a drop in transmission power to be compensated for by an increase in received quality by means of a drop in the MCS level. That is to say, when the SCCH degree of multiplexing is low, it is necessary for an MCS with a rather low MCS level to be set as an SCCH MCS.

On the other hand, if the SCCH degree of multiplexing—that is, the number of mobile stations assigned per subframe—is sufficiently high (for example, in the case of an SCCH degree of multiplexing of 12), there is a higher probability of those mobile stations being distributed evenly and uniformly within a cell. In this case, therefore, mobile stations ranging from those reporting high received quality to those reporting low received quality are evenly and uniformly present, as a result of which SCCHs with various kinds of transmission power, from high-transmission-power SCCHs to low-transmission-power SCCHs, are multiplexed. Also, as stated above, permissible transmission power in a base station is proportional to the SCCH degree of multiplexing—that is, permissible transmission power increases as the SCCH degree of multiplexing increases. In this case, therefore, there is a high probability of total SCCH transmission power being able to be accommodated within the permissible transmission power. Thus, when the SCCH degree of multiplexing is sufficiently high, the SCCH transmission power of all mobile stations can be made transmission power that satisfies the required received quality. Also, since the number of mobile stations per subframe is sufficiently high, the 95% coverage target can be met comfortably even if there are some mobile stations that are unable to satisfy the required received quality. Therefore, when the SCCH degree of multiplexing is high, there is a margin for enabling the SCCH MCS level to be increased. That is to say, when the SCCH degree of multiplexing is high, communication overhead due to SCCHs can be reduced by setting an MCS with a high MCS level as an SCCH MCS and increasing the transmission rate (bit rate).

Thus, in this embodiment, an SCCH MCS—that is, an MCS in encoding/modulating sections 101-1 through 101-n—is set as described below. Examples of MCS setting by MCS setting section 120 are given below.

In the setting examples according to this embodiment, a case is described in which the SCCH degree of multiplexing is fixed and does not vary on a subframe-by-subframe basis.

Figure 2:
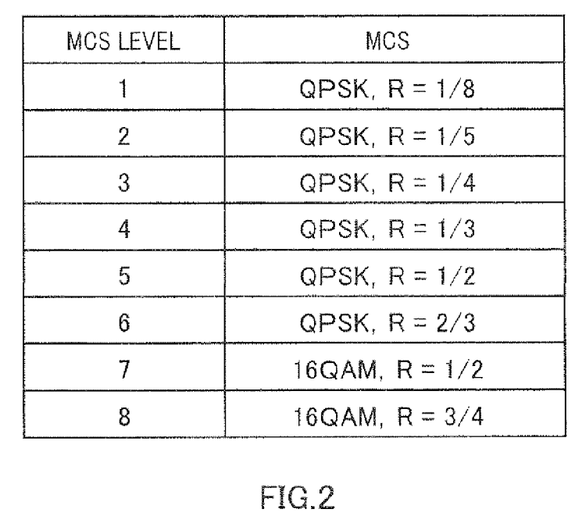
FIG. 2 is a drawing showing MCS levels according to Embodiment 1.

In all the following descriptions, an MCS with an MCS level from 1 to 8, as shown in FIG. 2, is set for an SCCH. As can be seen from FIG. 2, with regard to modulation schemes, the modulation level (M-ary modulation number) increases as the MCS level increases, and with regard to coding ratios, the coding ratio increases as the MCS level increases. That is to say, as the MCS level increases the transmission rate (bit rate)

increases, while the error rate performance degrades and transmission power required to achieve a predetermined error rate increases.

MCS Setting Example 1-1

Figure 3A:
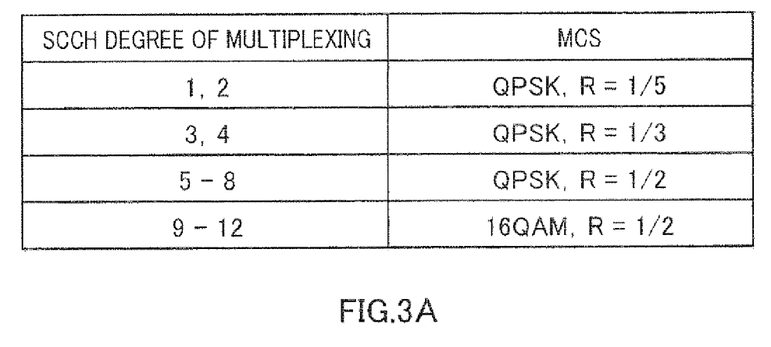
FIG. 3A is a reference table (table example 1) according to MCS setting example 1-1 of Embodiment 1.
Figure 3B:
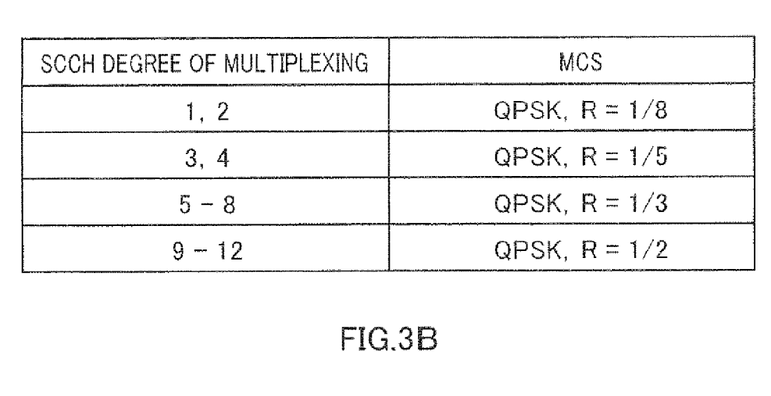
FIG. 3B is a reference table (table example 2) according to MCS setting example 1-1 of Embodiment 1.

FIG. 3A, FIG. 3B

In this setting example, MCS setting section 120 is provided with the table shown in FIG. 3A, and sets an SCCH MCS according to an SCCH degree of multiplexing. The SCCH degree of multiplexing is reported from a Radio Network Controller in a layer above base station 100.

MCS setting section 120 references the table shown in FIG. 3A in accordance with this report and selects one of four MCSs. For example, if the SCCH degree of multiplexing is 3, a "modulation scheme: QPSK, coding ratio: R=1/3" MCS is selected and set in encoding/modulating sections 101-1 through 101-*n*, while if the SCCH degree of multiplexing is 9, a "modulation scheme: 16QAM, coding ratio: R=1/2" MCS is selected and set in encoding/modulating sections 101-1 through 101-*n*. That is to say, MCS setting section 120 sets the MCS of a plurality of SCCHs multiplexed at the same time as an MCS with a higher MCS level the higher the SCCH degree of multiplexing.

In this setting example, the table shown in FIG. 3B may be used instead of the table shown in FIG. 3A. The table shown in FIG. 3B is the same as the table shown in FIG. 3A in that the MCS level increases as the SCCH degree of multiplexing increases. However, in the table shown in FIG. 3B, although the coding ratio increases as the SCCH degree of multiplexing increases, the modulation scheme is fixed at QPSK irrespective of the SCCH degree of multiplexing.

Thus, according to this setting example, an SCCH MCS is set according to an SCCH degree of multiplexing, enabling the SCCH transmission rate (bit rate) to be increased while meeting a coverage target, and so enabling communication overhead due to SCCHs to be reduced.

MCS Setting Example 1-2

Figure 4A:
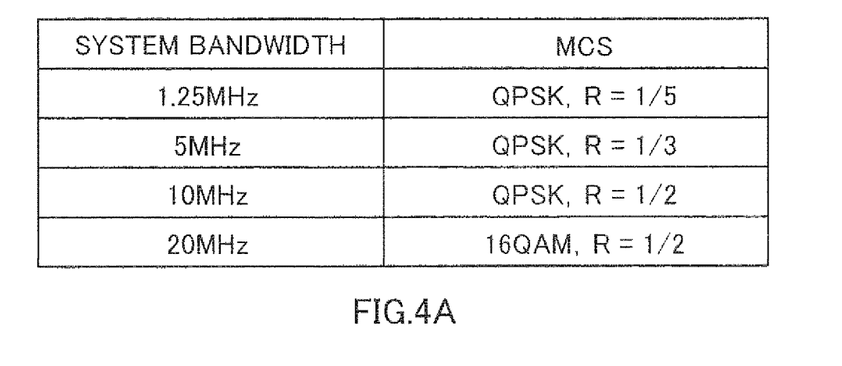
FIG. 4A is a reference table (table example 1) according to MCS setting example 1-2 of Embodiment 1.
Figure 4B:
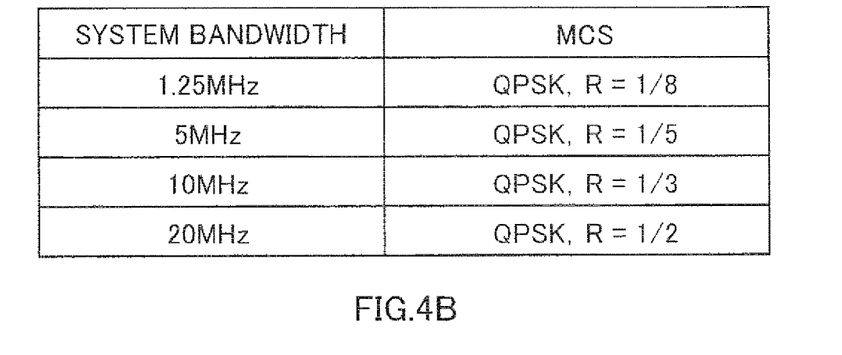
FIG. 4B is a reference table (table example 2) according to MCS setting example 1-2 of Embodiment 1.

FIG. 4A, FIG. 4B

Generally, the wider the system bandwidth the greater is the number of mobile stations that can be accommodated, and therefore it can be considered that the wider the system bandwidth the greater is the number of mobile stations per subframe. That is to say, it can be considered that the wider the system bandwidth the higher is the SCCH degree of multiplexing. Therefore, the same kind of effect as in setting example 1-1 can be obtained by setting an SCCH MCS according to the system bandwidth instead of according to an SCCH degree of multiplexing.

Thus, in this setting example, MCS setting section 120 is provided with the table shown in FIG. 4A, and sets an SCCH MCS according to the system bandwidth. The system bandwidth is reported from a radio network controller in a layer above base station 100.

MCS setting section 120 references the table shown in FIG. 4A in accordance with this report and selects one of four MCSs. For example, if the system bandwidth is 5 MHz, a "modulation scheme: QPSK, coding ratio: R=1/3" MCS is selected and set in encoding/modulating sections 101-1 through 101-*n*, while if the system bandwidth is 20 MHz, a "modulation scheme: 16QAM, coding ratio: R=1/2" MCS is selected and set in encoding/modulating sections 101-1 through 101-*n*. That is to say, MCS setting section 120 sets the MCS of a plurality of SCCHs multiplexed at the same time as an MCS with a higher MCS level the wider the system bandwidth. MCS setting section 120 sets the same MCS for the MCS of all SCCHs multiplexed at the same time.

In this setting example, in the same way as in setting example 1-1, the table shown in FIG. 4B may be used instead of the table shown in FIG. 4A.

Thus, according to this setting example, an SCCH MCS is set according to the system bandwidth, enabling the SCCH transmission rate (bit rate) to be increased while meeting a coverage target, and so enabling communication overhead due to SCCHs to be reduced, in the same way as in setting example 1-1.

MCS Setting Example 1-3

Figure 5A:
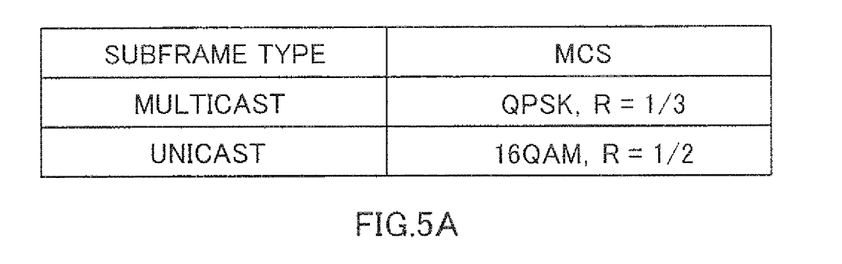
FIG. 5A is a reference table (table example 1) according to MCS setting example 1-3 of Embodiment 1.
Figure 5B:
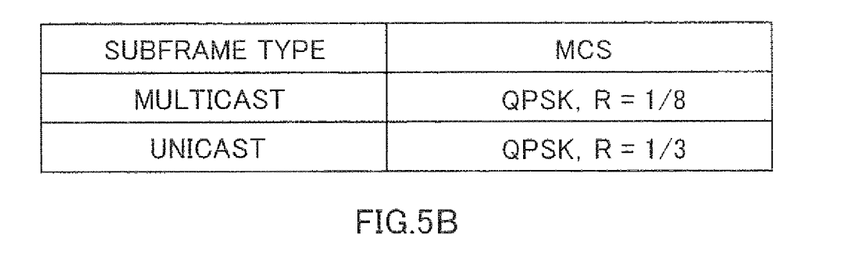
FIG. 5B is a reference table (table example 2) according to MCS setting example 1-3 of Embodiment 1.

FIG. 5A, FIG. 5B

Recently, studies have been carried out concerning multicast communication. Multicast communication is one-to-many communication rather than one-to-one communication such as unicast communication. That is to say, with multicast communication, one base station transmits the same data to a plurality of mobile stations. By means of this multicast communication, music data and video image data distribution services, TV broadcast and suchlike broadcast services, and so forth, are implemented in a mobile communication system. In contrast, with unicast communication, one base station transmits mutually different data to a plurality of mobile stations.

Recently, also, switching between multicast communication and unicast communication in subframe units has been studied. Below, a subframe for which multicast communication is performed is referred to as a multicast subframe, and a subframe for which unicast communication is performed is referred to as a unicast subframe.

Whereas multicast communication employs a communication mode whereby information is transmitted only to specific mobile stations subscribing to a service such as a news group, broadcast communication employs a communication mode whereby information is transmitted to all mobile stations as in the case of current TV and radio broadcasting. However, multicast and broadcast are the same in that one base station transmits the same data to a plurality of mobile stations, and so multicast is also called broadcast. Multicast and broadcast together are also called MBMS (Multimedia Broadcast/Multicast Service).

With a multicast subframe, as described above, per-mobile-station individual data is not transmitted, and therefore there is no SCCH for such individual data. Therefore, with a multicast subframe, the SCCH degree of multiplexing is lower than in the case of a unicast subframe. Therefore, the same kind of effect as in setting example 1-1 can be obtained by setting an SCCH MCS according to the subframe type— that is, whether a subframe is a multicast subframe or a unicast subframe—instead of according to an SCCH degree of multiplexing.

Thus, in this setting example, MCS setting section 120 is provided with the table shown in FIG. 5A, and sets an SCCH MCS according to the subframe type. The subframe type is reported from a radio network controller in a layer above base station 100.

MCS setting section 120 references the table shown in FIG. 5A in accordance with this report and selects one of two MCSs. Namely, if the subframe type is a multicast subframe, a "modulation scheme: QPSK, coding ratio: R=1/3" MCS is selected and set in encoding/modulating sections 101-1 through 101-*n*, while if the subframe type is a unicast subframe, a "modulation scheme: 16QAM, coding ratio: R=1/2" MCS is selected and set in encoding/modulating sections 101-1 through 101-*n*. That is to say, for a plurality of SCCHs multiplexed at the same time in a unicast subframe, MCS setting section 120 sets an MCS with a higher MCS level than the MCS level of an MCS set for a plurality of SCCHs multiplexed at the same time in a multicast subframe. MCS setting section 120 sets the same MCS for the MCS of all SCCHs multiplexed at the same time.

In this setting example, in the same way as in setting example 1-1, the table shown in FIG. 5B may be used instead of the table shown in FIG. 5A.

Thus, according to this setting example, an SCCH MCS is set according to the subframe type, enabling the SCCH transmission rate (bit rate) to be increased while meeting a coverage target, and so enabling communication overhead due to SCCHs to be reduced, in the same way as in setting example 1-1.

This concludes a description of MSC setting examples 1-1 through 1-3.

Thus, according to this embodiment, an SCCH MCS is set according to an SCCH degree of multiplexing, system bandwidth, or subframe type, enabling the SCCH transmission rate (bit rate) to be increased while meeting a coverage target, and so enabling communication overhead due to SCCHs to be reduced.

Also, according to this embodiment, base station 100 can report an SCCH MCS to all mobile stations by reporting an SCCH degree of multiplexing, system bandwidth, or subframe type in common to all mobile stations. Thus, according to this embodiment, per-mobile-station SCCH MCS reporting can be eliminated, enabling communication overhead due to SCCHs to be further reduced.

Embodiment 2

Figure 6:
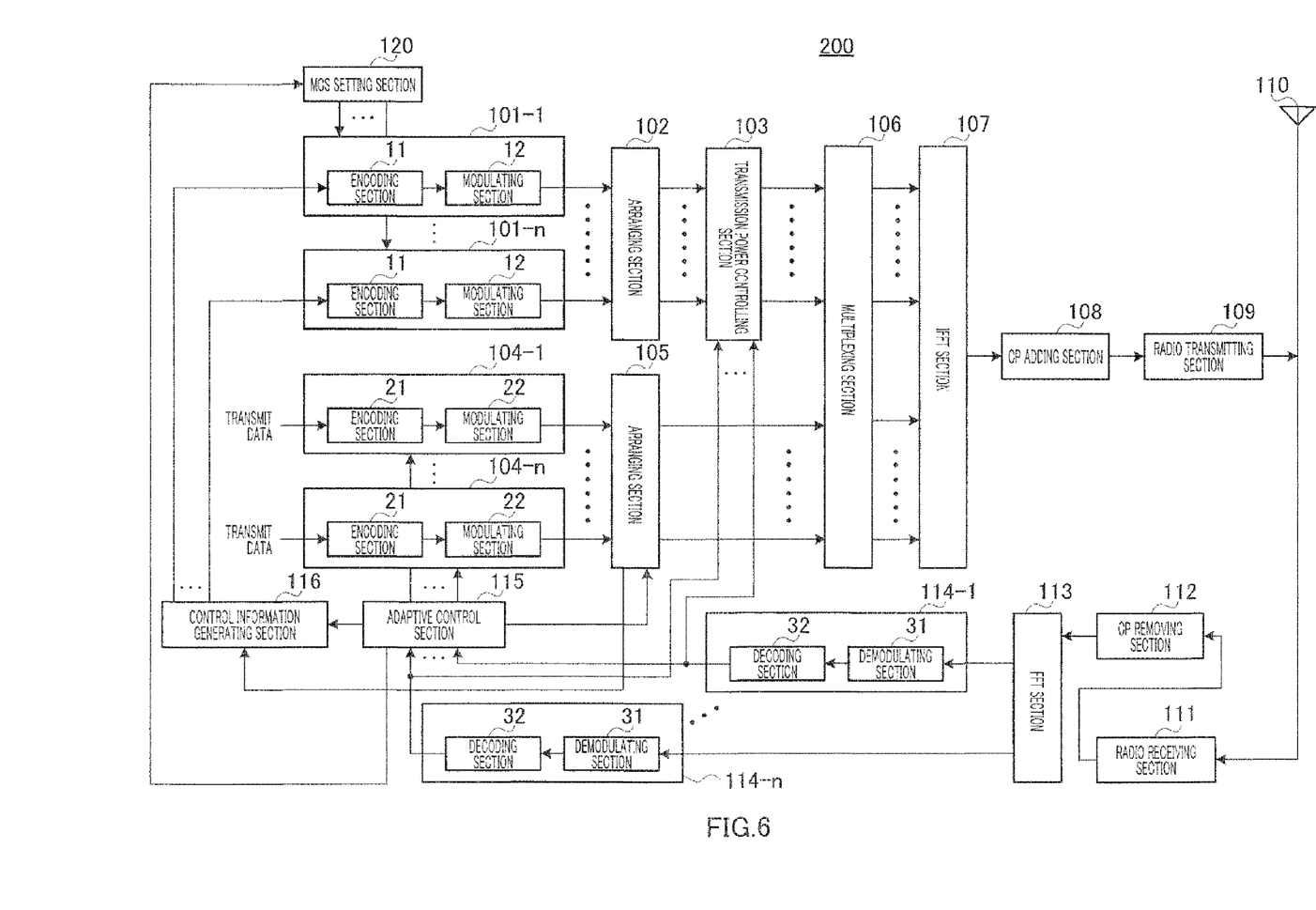
FIG. 6 is a block diagram showing the configuration of a base station according to Embodiment 2.

In Embodiment 1, a case was described in which an SCCH degree of multiplexing is fixed and does not vary on a subframe-by-subframe basis. When, in contrast, an SCCH degree of multiplexing varies on a subframe-by-subframe basis, the configuration of a base station is as shown in FIG. 6. Configuration parts in FIG. 6 identical to those in FIG. 1 (Embodiment 1) are assigned the same reference codes as in FIG. 1, and descriptions thereof are omitted here.

In base station 200 shown in FIG. 6, adaptive control section 115, in addition to performing the processing described in Embodiment 1, determines an SCCH degree of multiplexing on a subframe-by-subframe basis taking the number of mobile stations per subframe and so forth into consideration, and outputs the determined SCCH degree of multiplexing to MCS setting section 120.

MCS setting section 120 sets an SCCH MCS according to an SCCH degree of multiplexing in the same way as in MCS setting example 1-1 in Embodiment 1.

Thus, according to this embodiment, an optimal MCS can also be set as an SCCH MCS according to an SCCH degree of multiplexing when the SCCH MCS varies on a subframe-by-subframe basis. Therefore, when the SCCH MCS varies on a subframe-by-subframe basis, also, communication overhead due to SCCHs can be reduced while meeting a coverage target.

Embodiment 3

When it is possible to set any of eight MCSs as an SCCH MCS as shown in FIG. 2, 3-bit information "000" through "111" corresponding to each of the eight MCSs is necessary in order to report a set MCS to each mobile station.

Also, as described in Embodiment 1, if an SCCH degree of multiplexing is low, it is necessary for an MCS with a low MCS level to be set as the SCCH MCS. On the other hand, if an SCCH degree of multiplexing is high, an MCS with a high MCS level can be set as the SCCH MCS.

Thus, in this embodiment, the number of bits for reporting an MCS is decreased and communication overhead due to SCCHs is reduced by limiting MCSs that can be set as an SCCH MCS to some MCS candidates according to an SCCH degree of multiplexing, system bandwidth, or subframe type.

Figure 7:
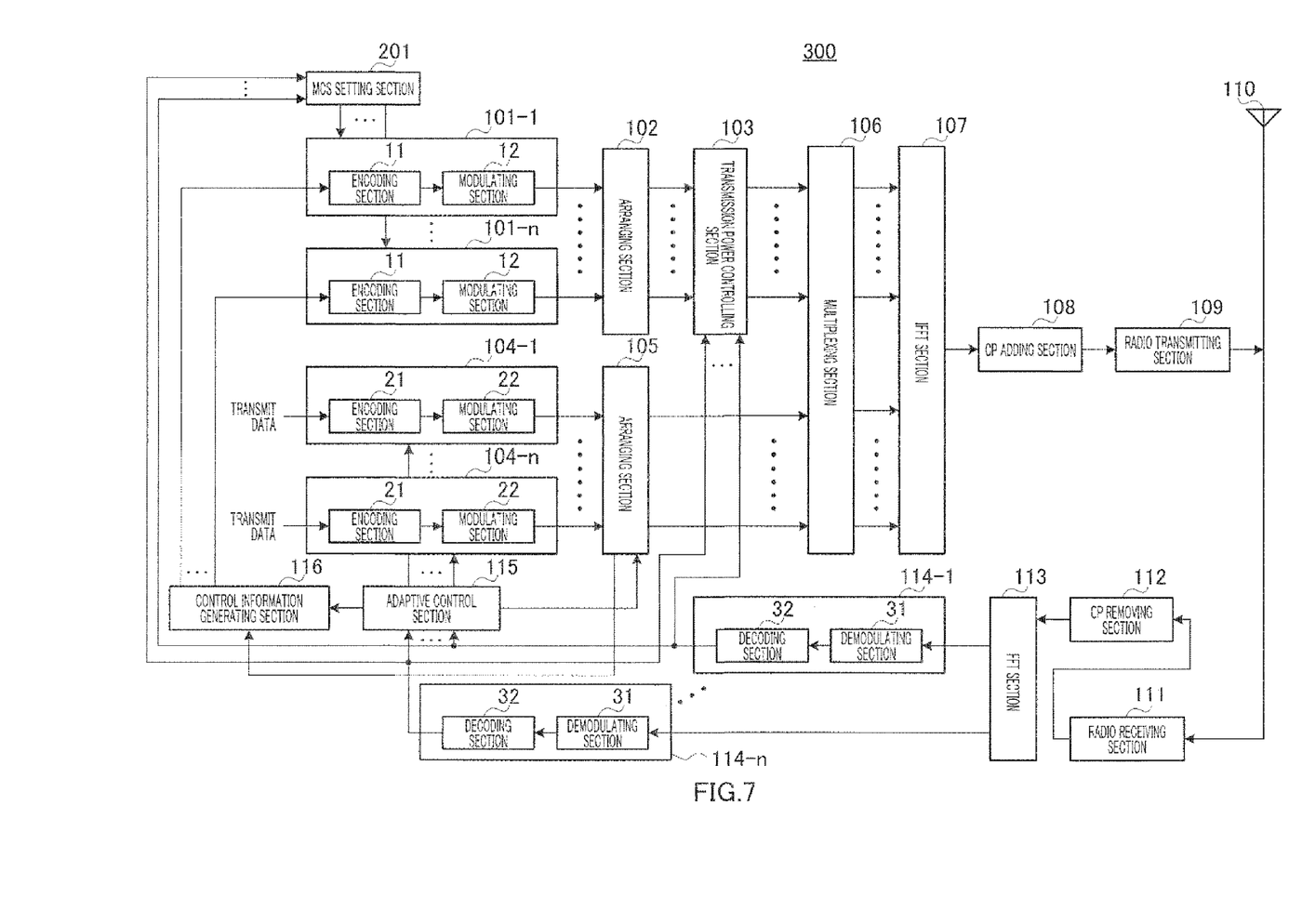
FIG. 7 is a block diagram showing the configuration of a base station according to Embodiment 3.

The configuration of base station 300 according to this embodiment is shown in FIG. 7. Configuration parts in FIG. 7 identical to those in FIG. 1 (Embodiment 1) are assigned the same reference codes as in FIG. 1, and descriptions thereof are omitted here.

In base station 300 shown in FIG. 7, each decoding section 32 outputs received quality information within receive data obtained by decoding processing to transmission power controlling section 103, adaptive control section 115, and MCS setting section 201.

MCS setting section 201 sets an MCS in encoding/modulating sections 101-1 through 101-*n*. Examples of MCS setting by MCS setting section 201 are given below.

In the setting examples according to this embodiment, a case is described in which the SCCH degree of multiplexing is fixed and does not vary on a subframe-by-subframe basis.

MCS Setting Example 2-1

Figure 8A:
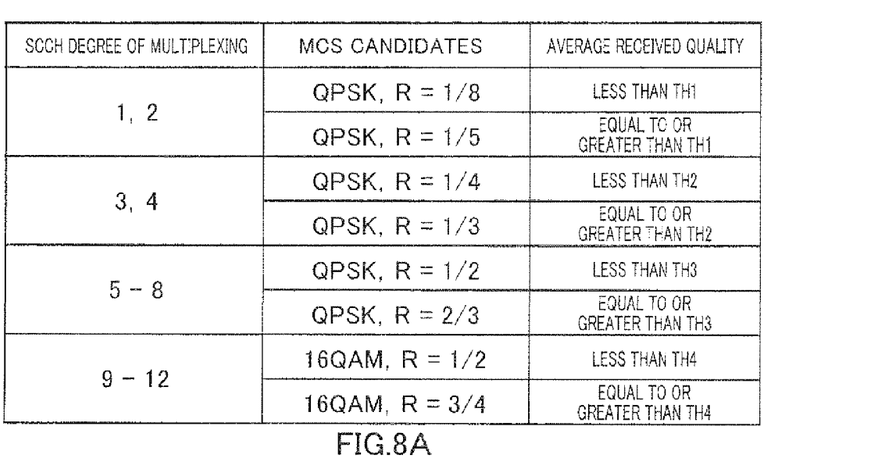
FIG. 8A is a reference table (table example 1) according to MCS setting example 2-1 of Embodiment 3.
Figure 8B:
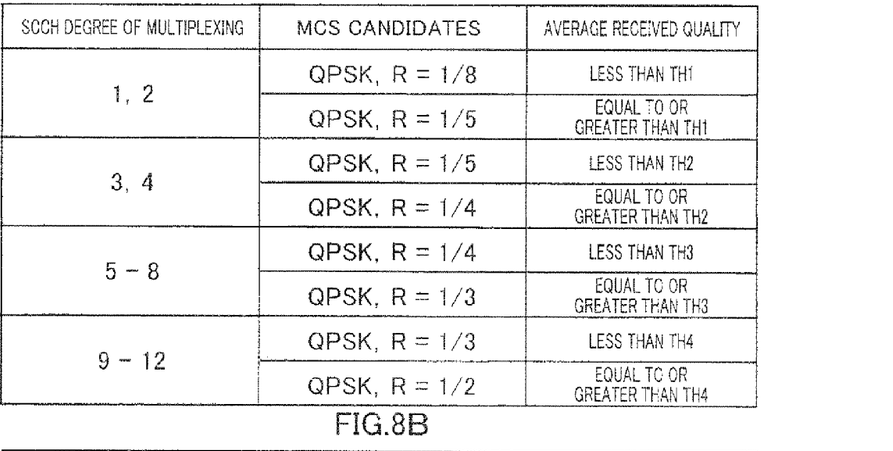
FIG. 8B is a reference table (table example 2) according to MCS setting example 2-1 of Embodiment 3.
Figure 8C:
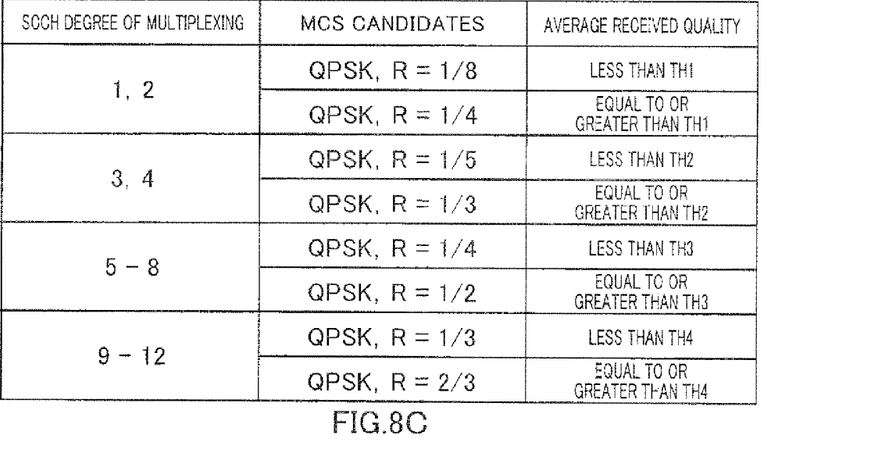
FIG. 8C is a reference table (table example 3) according to MCS setting example 2-1 of Embodiment 3.

FIG. 8A, FIG. 8B, FIG. 8C

In this setting example, MCS setting section 201 is provided with the table shown in FIG. 8A, and limits SCCH MCS candidates according to an SCCH degree of multiplexing. Also, MCS setting section 201 sets one MCS for an SCCH from among limited MCS candidates in accordance with an average received quality of all mobile stations. The SCCH degree of multiplexing is reported from a radio network controller in a layer above base station 300.

MCS setting section 201 references the table shown in FIG. 8A in accordance with this report and first limits the eight MCSs shown in FIG. 2 to two MCS candidates. For example, if the SCCH degree of multiplexing is 3, two MCSs comprising a "modulation scheme: QPSK, coding ratio: R=1/4" MCS and a "modulation scheme: QPSK, coding ratio: R=1/3" MCS are taken as SCCH MCS candidates. Also, if the SCCH degree of multiplexing is 9, two MCSs comprising a "modulation scheme: 16QAM, coding ratio: R=1/2" MCS and a "modulation scheme: 16QAM, coding ratio: R=3/4" MCS are taken as SCCH MCS candidates. That is to say, MCS setting section 201 limits MCS candidates of a plurality of SCCHs multiplexed at the same time to MCSs with a higher MCS level the higher the SCCH degree of multiplexing.

By this means, 1-bit information "0" or "1" corresponding respectively to each of two MCS candidates suffices to report a set MCS to each mobile station.

Next, MCS setting section 201 compares an average received quality of all mobile stations found from received quality information input from each decoding section 32 with a threshold value, references the table shown in FIG. 8A, and selects one of the two MCS candidates according to the comparison result. For example, if the SCCH degree of multiplexing is 3 and the average received quality is less than threshold value TH2, a "modulation scheme: QPSK, coding ratio: R=1/4" MCS is selected and set in encoding/modulating sections 101-1 through 101-*n*. On the other hand, if the SCCH degree of multiplexing is 3 and the average received quality is greater than or equal to threshold value TH2, a "modulation scheme: QPSK, coding ratio: R=1/3" MCS is selected and set in encoding/modulating sections 101-1 through 101-*n*. MCS setting section 201 sets the same MCS for the MCS of all SCCHs multiplexed at the same time.

The relationship between the threshold values in FIG. 8 is TH1<TH2<TH3<TH4.

In this setting example, the table shown in FIG. 8B may be used instead of the table shown in FIG. 8A. The table shown in FIG. 8B is the same as the table shown in FIG. 5A in that the maximum MCS level of MCS candidates increases as the SCCH degree of multiplexing increases. However, in the table shown in FIG. 8B, some MCS candidates overlap SCCH degree-of-multiplexing sections. For example, a "modulation scheme: QPSK, coding ratio: R=1/4" MCS is an MCS candidate both when the SCCH degree of multiplexing is "3, 4" and when the SCCH degree of multiplexing is "5-8"

Also, in this setting example, the table shown in FIG. 8C may be used instead of the table shown in FIG. 8A. The table shown in FIG. 8C is the same as the table shown in FIG. 8A in that the maximum MCS level of MCS candidates increases as the SCCH degree of multiplexing increases. However, in the table shown in FIG. 8C, between SCCH degree-of-multiplexing sections, the MCS candidate maximum MCS level in one section is between the MCS candidate maximum MCS level and minimum MCS level of another section. For example, the "modulation scheme: QPSK, coding ratio: R=1/3" MCS candidate MCS level when the SCCH degree of multiplexing is "3, 4" (the maximum MCS level when the SCCH degree of multiplexing is "3, 4") is between the "modulation scheme: QPSK, coding ratio: R=1/2" MCS candidate MCS level when the SCCH degree of multiplexing is "5-8" (the maximum MCS level when the SCCH degree of multiplexing is "5-8") and the "modulation scheme: QPSK, coding ratio: R=1/4" MCS candidate MCS level when the SCCH degree of multiplexing is "5-8" (the minimum MCS level when the SCCH degree of multiplexing is "5-8").

Thus, according to this setting example, SCCH MCS candidates are limited according to an SCCH degree of multiplexing, enabling the SCCH transmission rate (bit rate) to be increased while meeting a coverage target, and so enabling communication overhead due to SCCHs to be reduced, in the same way as in Embodiment 1.

Also, according to this setting example, the amount of signaling can be reduced by reducing the number of bits necessary for information for reporting an SCCH MCS to a mobile station, enabling communication overhead due to SCCHs to be further reduced.

Furthermore, since an MCS is set using received quality, a more accurate MCS can be set than in Embodiment 1.

MCS Setting Example 2-2

FIG. 9A, FIG. 9B, FIG. 9C

Figure 9A:
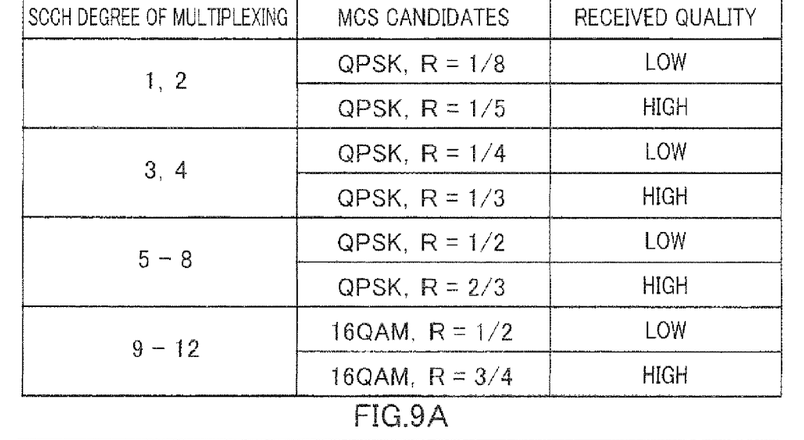
FIG. 9A is a reference table (table example 1) according to MCS setting example 2-2 of Embodiment 3.

In this setting example, MCS setting section 201 is provided with the table shown in FIG. 9A, and limits SCCH MCS candidates according to an SCCH degree of multiplexing, in the same way as in setting example 2-1. Also, MCS setting section 201 sets one MCS for an SCCH from among limited MCS candidates for each SCCH in accordance with received quality of each mobile station. The SCCH degree of multiplexing is reported from a radio network controller in a layer above base station 300. Limiting of MCS candidates in this setting example is the same as in setting example 2-1, and therefore a description thereof is omitted here.

MCS setting section 201 categorizes mobile stations into a low-received quality first group and a high-received quality second group based on the received quality of each mobile station obtained from received quality information input from each decoding section 32. Then MCS setting section 201 references the table shown in FIG. 9A and selects one MCS from two MCS candidates for each SCCH. For example, if the SCCH degree of multiplexing is 3, a "modulation scheme: QPSK, coding ratio: R=1/4" MCS is selected for the SCCH of a mobile station belonging to the first group, and is set in an encoding/modulating section corresponding to that mobile station among encoding/modulating sections 101-1 through 101-*n*. On the other hand, if the SCCH degree of multiplexing is 3, a "modulation scheme: QPSK, coding ratio: R=1/3" MCS is selected for the SCCH of a mobile station belonging to the second group and is set in an encoding/modulating section corresponding to that mobile station among encoding/modulating sections 101-1 through 101-*n*.

Figure 9B:
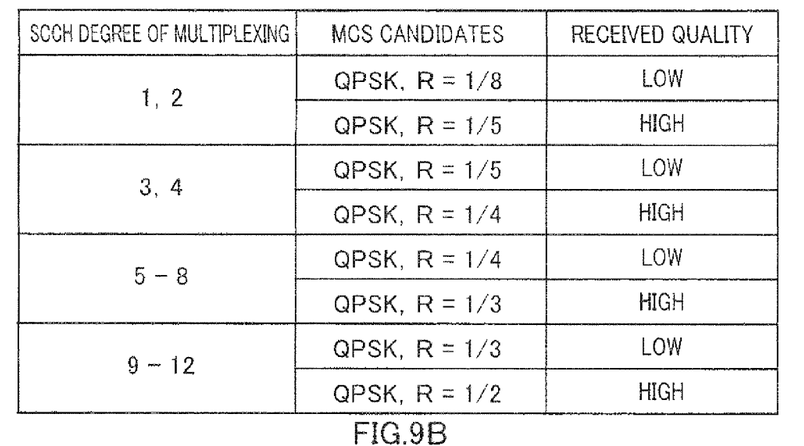
FIG. 9B is a reference table (table example 2) according to MCS setting example 2-2 of Embodiment 3.
Figure 9C:
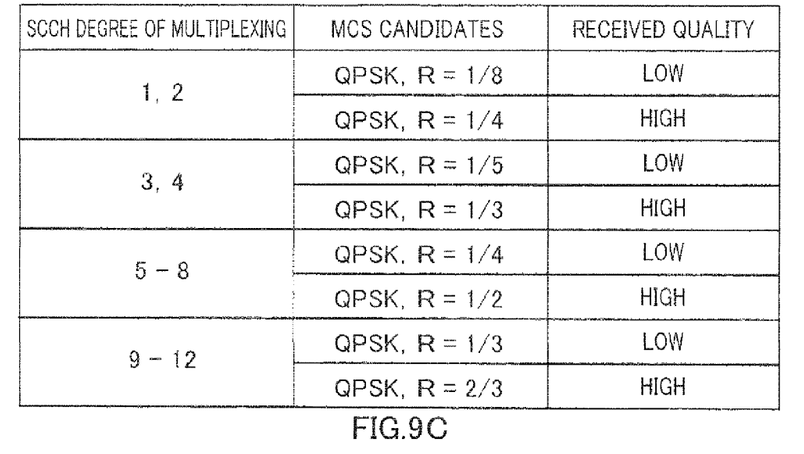
FIG. 9C is a reference table (table example 3) according to MCS setting example 2-2 of Embodiment 3.

In this setting example, in the same way as in setting example 2-1, the table shown in FIG. 9B or the table shown in FIG. 9C may be used instead of the table shown in FIG. 9A.

Thus, according to this setting example, in the same way as in setting example 2-1, SCCH MCS candidates are limited according to an SCCH degree of multiplexing, enabling the SCCH transmission rate (bit rate) to be increased while meeting a coverage target, and so enabling communication overhead due to SCCHs to be reduced.

Also, according to this setting example, in the same way as in setting example 2-1, the amount of signaling can be reduced by reducing the number of bits necessary for information for reporting an SCCH MCS to a mobile station, enabling communication overhead due to SCCHs to be further reduced.

Furthermore, since an MCS is set on an SCCH-by-SCCH basis using per-mobile-station received quality, a still more accurate MCS can be set than in the case of setting example 2-1.

This concludes a description of MSC setting examples 2-1 and 2-2.

In setting examples 2-1 and 2-2, MCS candidates were limited according to an SCCH degree of multiplexing, but MCS candidates may also be limited according to system bandwidth or subframe type, as in setting example 1-2 and setting example 1-3 in Embodiment 1.

MCS setting section 201 has a plurality of tables in which mutually different MCS candidates are set according to an SCCH degree of multiplexing, system bandwidth, or subframe type, but MCS candidates may also be limited by selecting one table according to an SCCH degree of multiplexing, system bandwidth, or subframe type.

Thus, according to this embodiment, SCCH MCS candidates are set according to an SCCH degree of multiplexing, system bandwidth, or subframe type, enabling the SCCH transmission rate (bit rate) to be increased while meeting a coverage target, and so enabling communication overhead due to SCCHs to be reduced, in the same way as in Embodiment 1.

Embodiment 4

Figure 10:
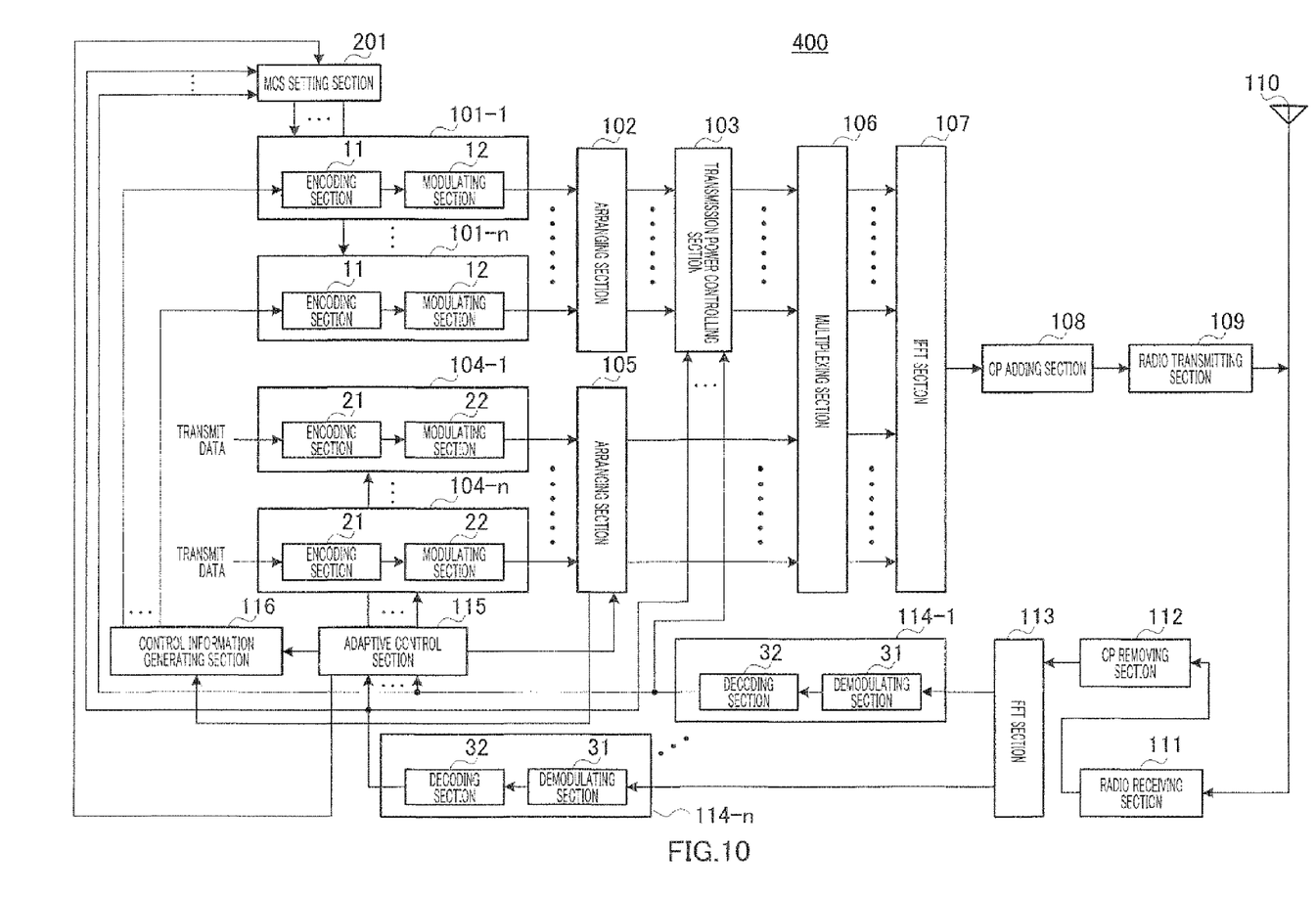
FIG. 10 is a block diagram showing the configuration of a base station according to Embodiment 4.

In Embodiment 3, a case was described in which an SCCH degree of multiplexing is fixed and does not vary on a subframe-by-subframe basis. When, in contrast, an SCCH degree of multiplexing varies on a subframe-by-subframe basis, the configuration of a base station is as shown in FIG.

10. Configuration parts in FIG. 10 identical to those in FIG. 7 (Embodiment 3) are assigned the same reference codes as in FIG. 7, and descriptions thereof are omitted here.

In base station 400 shown in FIG. 10, adaptive control section 115, in addition to performing the processing described in Embodiment 3, determines an SCCH degree of multiplexing taking the number of mobile stations and so forth into consideration, and outputs the determined SCCH degree of multiplexing to MCS setting section 201.

MCS setting section 201 limits SCCH MCS candidates according to an SCCH degree of multiplexing in the same way as in MCS setting example 2-1 in Embodiment 3.

Thus, according to this embodiment, SCCH MCS candidates can also be limited to an optimal MCS candidate according to an SCCH degree of multiplexing when the SCCH MCS varies on a subframe-by-subframe basis. Therefore, when the SCCH MCS varies on a subframe-by-subframe basis, also, communication overhead due to SCCHs can be reduced while meeting a coverage target.

This concludes a description of embodiments of the present invention.

A subframe used in the above description may also be another transmission time unit such as a time slot, frame, or the like, for example.

A resource block used in the above description may also be another frequency-domain transmission unit such as a subcarrier block or the like, for example.

A mobile station may also be called UE, a base station apparatus Node B, and a subcarrier a tone. A resource block may also be called a subband, subchannel, subcarrier block, or chunk. A CP may also be called a Guard Interval (GI).

Uplink assignment information, an Ack/Nack signal, a PI (Paging Indicator), and a random access response or suchlike control signal may also be transmitted in an SCCH in addition to a mobile station ID, resource block number, and MCS information. An SCCH may also be called a PDCCH (Physical Downlink Control CHannel).

In the above description, SCCHs have been given as an example of channels that are multiplexed at the same time and for which transmission power control is performed individually on a mobile station by mobile station basis. However, the present invention is not limited to this, and the present invention can also be applied to all channels that are multiplexed at the same time and for which transmission power control is performed individually on a mobile station by mobile station basis.

In the above description, control information is transmitted to one mobile station via one SCCH, but a plurality of mobile stations may also be grouped, and one SCCH used by a group unit. In this case, transmission power control based on received quality is performed in accordance with the mobile station with the lowest received quality within a group.

In the above description, an example has been described in which an SCCH is arranged at the start of a subframe, but an SCCH may also be arranged at a position other than the start of a subframe, such as in the second OFDM symbol of a subframe, for example.

In the above description, an example has been described in which an SCCH and data channel are time-domain-multiplexed, but an SCCH and data channel may also be frequency-domain-multiplexed.

The SCCH multiplexing method is not limited to frequency domain multiplexing, but may also be code multiplexing, for example.

In the above description, transmission power control is performed after SCCH arrangement on subcarriers, but SCCH arrangement on subcarriers may also be performed after SCCH transmission power control. That is to say, in FIG. 1, FIG. 6, FIG. 7, and FIG. 10, the positions of arranging section 102 and transmission power controlling section 103 may be reversed, so that transmission power controlling section 103 is provided at a stage prior to arranging section 102.

The methods of performing conversion between the frequency domain and time domain are not limited to IFFT and FFT.

Since a resource amount used decreases the higher the MCS level, resource (times frequency, and antenna) amounts used for an SCCH may be changed according to the SCCH MCS level. For example, when the MCS level is increased the higher the SCCH degree of multiplexing, as in MCS setting example 1-1 in Embodiment 1, resource amounts used for one SCCH may be reduced proportionally as the SCCH degree of multiplexing increases.

The present invention may also be applied to only some SCCHs among a plurality of SCCHs multiplexed in one subframe. For example, provision may be made for an MCS (for example, modulation scheme: QPSK, coding ratio: R=1/8) that enables a required received quality to be obtained in a mobile station near a cell boundary to be fixed, even if transmission power is not raised, for one SCCH among a plurality of SCCHs multiplexed in one subframe, and for the MCS to be set according to the SCCH degree of multiplexing for the other SCCHs.

In the above embodiments, cases have been described by way of example in which the present invention is configured as hardware, but it is also possible for the present invention to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is rearranged by a different technology as an advance in, or derivation from, semiconductor technology, integration of the function blocks may of course be performed using that technology. The application of biotechnology or the like is also a possibility.

The disclosure of Japanese Patent Application No. 2006-349785, filed on Dec. 26, 2006, including the specification, drawings and abstract, is incorporated herein by reference in its entirety.

INDUSTRIAL APPLICABILITY

The present invention can be applied to a mobile communication system or the like.

The invention claimed is:

1. A radio communication base station apparatus that multiplexes a plurality of control channels at a same time in a given system bandwidth, to which the plurality of control channels for a plurality of mobile stations are mapped, the radio communication base station apparatus comprising:

an encoding section that encodes the plurality of control channels;

a modulating section that modulates the plurality of control channels; and a setting section that sets a modulation and coding scheme (MCS) level in the encoding section and the modulating section to a higher MCS level the wider the given system bandwidth.

2. The radio communication base station apparatus according to claim 1, wherein the setting section sets the MCS with a higher MCS level the higher the degree of multiplexing.

3. A method for controlling a modulation and coding scheme (MCS) of a control channel in a radio communication base station apparatus that multiplexes a plurality of control channels at a same time in a given system bandwidth, to which the plurality of control channels for a plurality of mobile stations are mapped, wherein the method sets an MCS level of a control channel to a higher MCS level the wider the given system bandwidth.

* * * * *